United States Patent
Willis et al.

(10) Patent No.: US 11,041,548 B2
(45) Date of Patent: Jun. 22, 2021

(54) BELT TENSIONING SYSTEM AND BELT TENSIONING METHOD

(71) Applicant: Ford Global Technologies, LLC, Dearborn, MI (US)

(72) Inventors: Scott Willis, Gibraltar, MI (US); Kwan Jamal Barber, Southfield, MI (US); James Basile, Dundee, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 16/058,832

(22) Filed: Aug. 8, 2018

(65) Prior Publication Data
US 2020/0049233 A1 Feb. 13, 2020

(51) Int. Cl.
*F16H 7/12* (2006.01)
*F16H 7/08* (2006.01)

(52) U.S. Cl.
CPC ... *F16H 7/1281* (2013.01); *F16H 2007/0842* (2013.01); *F16H 2007/0865* (2013.01); *F16H 2007/0882* (2013.01); *F16H 2007/0893* (2013.01)

(58) Field of Classification Search
CPC .......... F16H 7/1281; F16H 2007/0893; F16H 2007/088; F16H 2007/0846; F16H 2007/0865
USPC ......................................... 474/112, 118, 119
See application file for complete search history.

(56) References Cited

U.S. PATENT DOCUMENTS

| | | | | |
|---|---|---|---|---|
| 891,636 A | * | 6/1908 | Sandera | F16H 7/16 474/109 |
| 932,000 A | * | 8/1909 | Cressman | F16H 7/0827 474/119 |
| 1,913,040 A | * | 6/1933 | Pierson | F16H 7/14 474/113 |
| 2,504,624 A | * | 4/1950 | Barnes | G05G 15/08 474/109 |
| 2,909,074 A | * | 10/1959 | Scheiterlein | F16H 7/14 474/86 |
| 3,071,980 A | * | 1/1963 | Brewer | F16H 7/1281 474/133 |
| 3,358,521 A | * | 12/1967 | Browning, Jr. | F16H 7/1281 474/133 |
| 3,545,294 A | * | 12/1970 | Dankowski | F16H 7/1281 474/112 |
| 3,924,483 A | * | 12/1975 | Walker | F02B 67/06 474/86 |
| 3,950,046 A | * | 4/1976 | Lubbersmeyer | F16C 13/006 384/546 |

(Continued)

FOREIGN PATENT DOCUMENTS

EP 2159448 A1 3/2010
FR 2588632 A1 4/1987

*Primary Examiner* — Henry Y Liu
(74) *Attorney, Agent, or Firm* — Geoffrey Brumbaugh; McCoy Russell LLP

(57) ABSTRACT

A belt tensioning system includes a stretch belt rotationally connected to a crankshaft pulley and an accessory pulley, and a tensioning device including a pivoting arm having a tensioning pulley coupled thereto and an arm stop positioned in a path of the pivoting arm to limit the rotation of the pivoting arm. Additionally, the tensioning device does not include a spring tensioner and is configurable in a tensioned configuration and an un-tensioned configuration.

20 Claims, 5 Drawing Sheets

(56) References Cited

U.S. PATENT DOCUMENTS

| | | | | |
|---|---|---|---|---|
| 4,324,552 A * | 4/1982 | Boushek, Jr. | A01D 69/00 | 474/118 |
| 4,443,210 A * | 4/1984 | Olschewski | F16H 7/1281 | 474/112 |
| 4,457,740 A * | 7/1984 | Olschewski | F16C 13/006 | 474/112 |
| 4,472,162 A * | 9/1984 | Hitchcock | F16H 7/1218 | 474/117 |
| 4,489,475 A * | 12/1984 | Struttmann | B23P 15/00 | 29/525.11 |
| 4,767,383 A * | 8/1988 | St. John | F16H 7/1281 | 474/111 |
| 4,957,471 A * | 9/1990 | St. John | F16H 7/1281 | 474/133 |
| 5,064,405 A * | 11/1991 | St. John | F16H 7/1281 | 474/133 |
| 5,078,656 A * | 1/1992 | Brandenstein | F16H 7/1281 | 474/112 |
| 5,820,503 A * | 10/1998 | Bruchner | F16H 7/1281 | 474/112 |
| 6,129,645 A * | 10/2000 | Burrows | B62M 9/16 | 474/112 |
| 6,312,352 B1 * | 11/2001 | Holland | A01D 34/76 | 474/113 |
| 6,602,155 B2 * | 8/2003 | Buss | A01D 34/76 | 474/101 |
| 6,605,013 B2 * | 8/2003 | Chambers | F16H 7/1281 | 474/133 |
| 6,699,149 B1 * | 3/2004 | White | F16H 7/18 | 474/118 |
| 7,874,950 B2 * | 1/2011 | Lehtovaara | F16H 7/1281 | 474/135 |
| 8,821,327 B1 * | 9/2014 | Stade | F16H 7/14 | 474/110 |
| 8,888,625 B2 * | 11/2014 | Lehman | A01D 45/023 | 474/117 |
| 9,239,097 B2 * | 1/2016 | Lescorail | F16H 7/12 | |
| 9,261,171 B2 * | 2/2016 | Doering | F16H 7/14 | |
| 9,458,915 B2 * | 10/2016 | Benz | F16H 7/24 | |
| 9,464,698 B2 * | 10/2016 | Mennerat | F16H 7/1281 | |
| 9,939,052 B2 * | 4/2018 | Bailliu | F16H 7/129 | |
| 10,054,200 B2 * | 8/2018 | Aubertin | F16H 7/129 | |
| 10,557,531 B2 * | 2/2020 | Herrala | F16H 7/1281 | |
| 2002/0037783 A1 * | 3/2002 | Chambers | F16H 7/1281 | 474/135 |
| 2002/0039944 A1 * | 4/2002 | Ali | F16H 7/1218 | 474/135 |
| 2003/0004023 A1 * | 1/2003 | Hotta | F02B 67/06 | 474/101 |
| 2003/0216203 A1 * | 11/2003 | Oliver | F16H 7/1281 | 474/134 |
| 2006/0089223 A1 * | 4/2006 | Van Vooren | A01D 43/086 | 474/133 |
| 2006/0217223 A1 * | 9/2006 | Schmid | F16H 7/1263 | 474/136 |
| 2012/0190488 A1 * | 7/2012 | Doering | B24B 47/10 | 474/112 |
| 2013/0165284 A1 * | 6/2013 | Mennerat | F16H 7/12 | 474/112 |
| 2014/0073467 A1 * | 3/2014 | Doering | F16H 7/14 | 474/112 |
| 2016/0091064 A1 * | 3/2016 | Aubertin | F16H 7/1281 | 474/133 |

\* cited by examiner

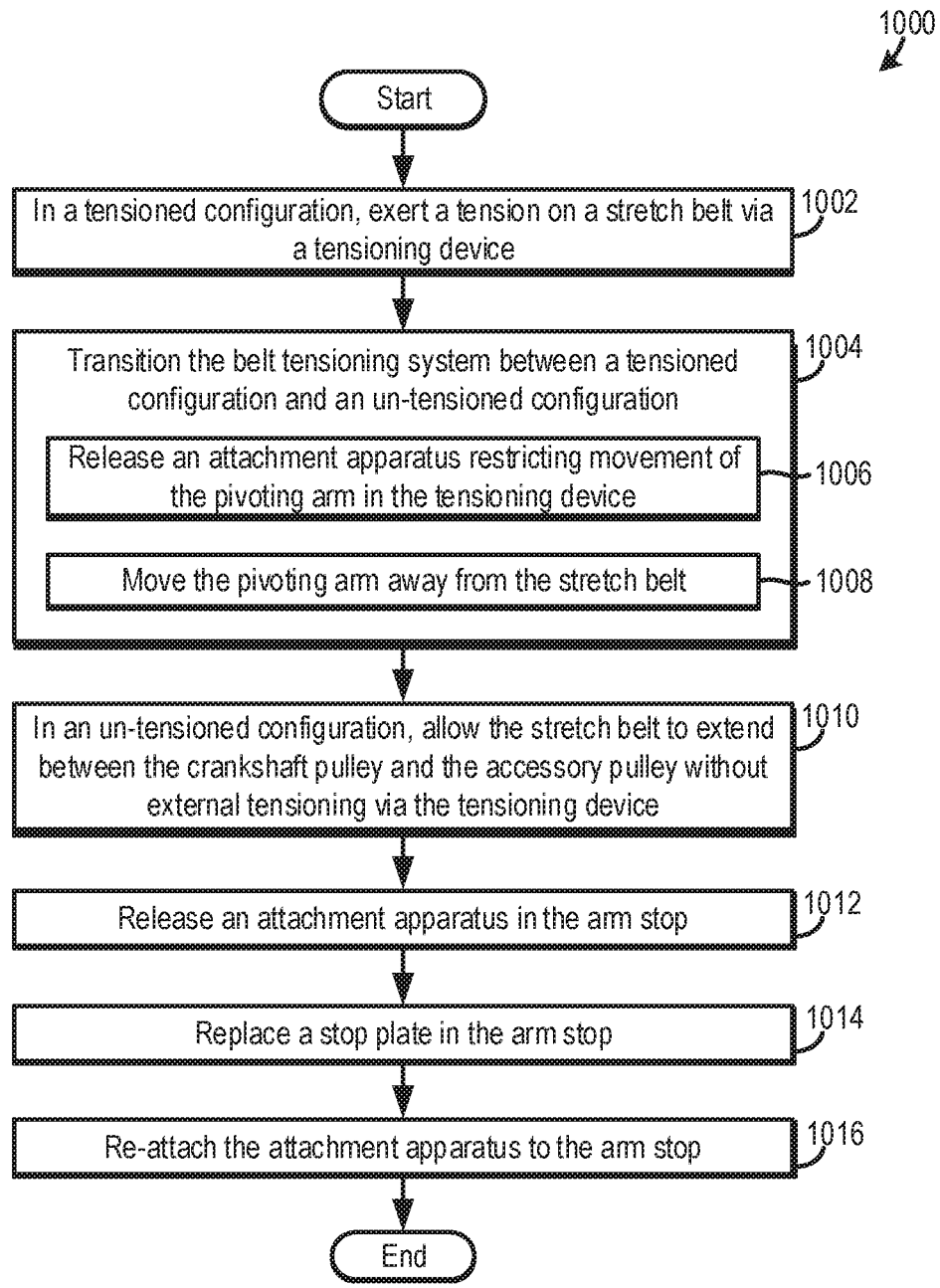

BELT TENSIONING SYSTEM AND BELT TENSIONING METHOD

FIELD

The present description relates generally to a belt tensioning system and a belt tensioning method.

BACKGROUND/SUMMARY

Accessory drive belts, such as stretch belts, are used in engines to connect the engine's rotational output to peripheral components such as water pumps, alternators, power steering pumps, air pumps, air condition compressors, etc. Stretch belts allow certain accessories in the accessory drive system to be rotationally coupled to the engine's rotational output without the use of a spring loaded tensioner. Spring loaded tensioners have the drawback of incurring additional system cost and complexity. Furthermore, by eliminating the spring loaded tensioners in the system the noise, vibration, and harshness (NVH) in the vehicle is able to be reduced. Other benefits of using stretch belts include reducing loads on other belts in the engine, such as a main accessory drive belt.

However, the inventors have recognized several drawbacks with stretch belts. One of the challenges of using a stretch belt is installation and servicing of the belt. Often, stretch belts require custom automation to install the belt at the production assembly plant to insure installation in the desired cycle time and to insure the belt is not damaged during installation. Custom automation can be very costly and can take up valuable assembly line space. Furthermore, when servicing the drive belts, in vehicles with tightly packaged engine compartments, it may be difficult to remove and reinstall the stretch belt. Thus, in some engines stretch belts may be cut off rather than being removed during belt servicing due to the confined engine compartment. Consequently, additional servicing cost may be incurred when a stretch belt is used to drive accessories as opposed to an accessory belt that is tensioned subsequent to installation of the belt on the pulleys.

To address at least some of the aforementioned problems a belt tensioning system in an engine is provided. The belt tensioning system includes a stretch belt rotationally connected to a crankshaft pulley and an accessory pulley, and a tensioning device including a pivoting arm having a tensioning pulley coupled thereto and an arm stop positioned in a path of the pivoting arm to limit the rotation of the pivoting arm. Additionally, the tensioning device does not include a spring tensioner and is configurable in a tensioned configuration and an un-tensioned configuration. In this way, the belt tensioner may tension the stretch belt without the use of a spring tensioner and the amount of tension exerted on the stretch belt may be precisely set by the arm stop. Consequently, the stretch belt may be efficiently tensioned during installation of the belt, during belt repair, etc. Furthermore, providing a belt tensioning system which does not use a spring tensioner may reduce the cost of the system as well as manufacturing costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 10 shows a method for installing a stretch belt.

FIGS. 2-9 are shown approximately to scale, however other relative dimension may be used, if desired.

DETAILED DESCRIPTION

A stretch belt tensioning system including a pivoting arm with a pulley allowing for quick and efficient stretch belt installation, replacement, servicing, etc., is described herein. In the system, an arm stop serves to limit rotational movement of the pivoting arm to control the tension exerted on the stretch belt via the pivoting arm. Consequently, the system can forgo any type of spring loaded mechanism for tensioning the arm, thereby reducing the cost of the system. Moreover, a plate in the arm stop may be easily replaced, thereby increasing the system's adaptability and serviceability. The plates may have different sizes and profiles, resulting in different pivoting arm positions causing the stretch belt to be tensioned by varying amounts. Using different stop plates allows the belt tensioning system to be used for belts having a variety of sizes and/or tensioning requirements in the engine. Consequently, belt tooling may be simplified. As a result, manufacturing costs of the belt tensioning system may be reduced. Changing the size and/or profile of the stop plate may also occur during servicing to reduce belt slipping and noise, vibration, and harshness (NVH) caused by the slipping. For instance, the length of the stretch belt may grow over time or the initial stretch belt tensioning may not provide desirable (e.g., optimal) tensioning due to design miscalculations, manufacturing tolerances, etc. As such, a smaller stop plate may be installed to allow the belt tensioning system to exert a greater tension on the stretch belt to reduce belt slippage. In this way, the belt tensioning system's adaptability may be increased.

Figure 1:
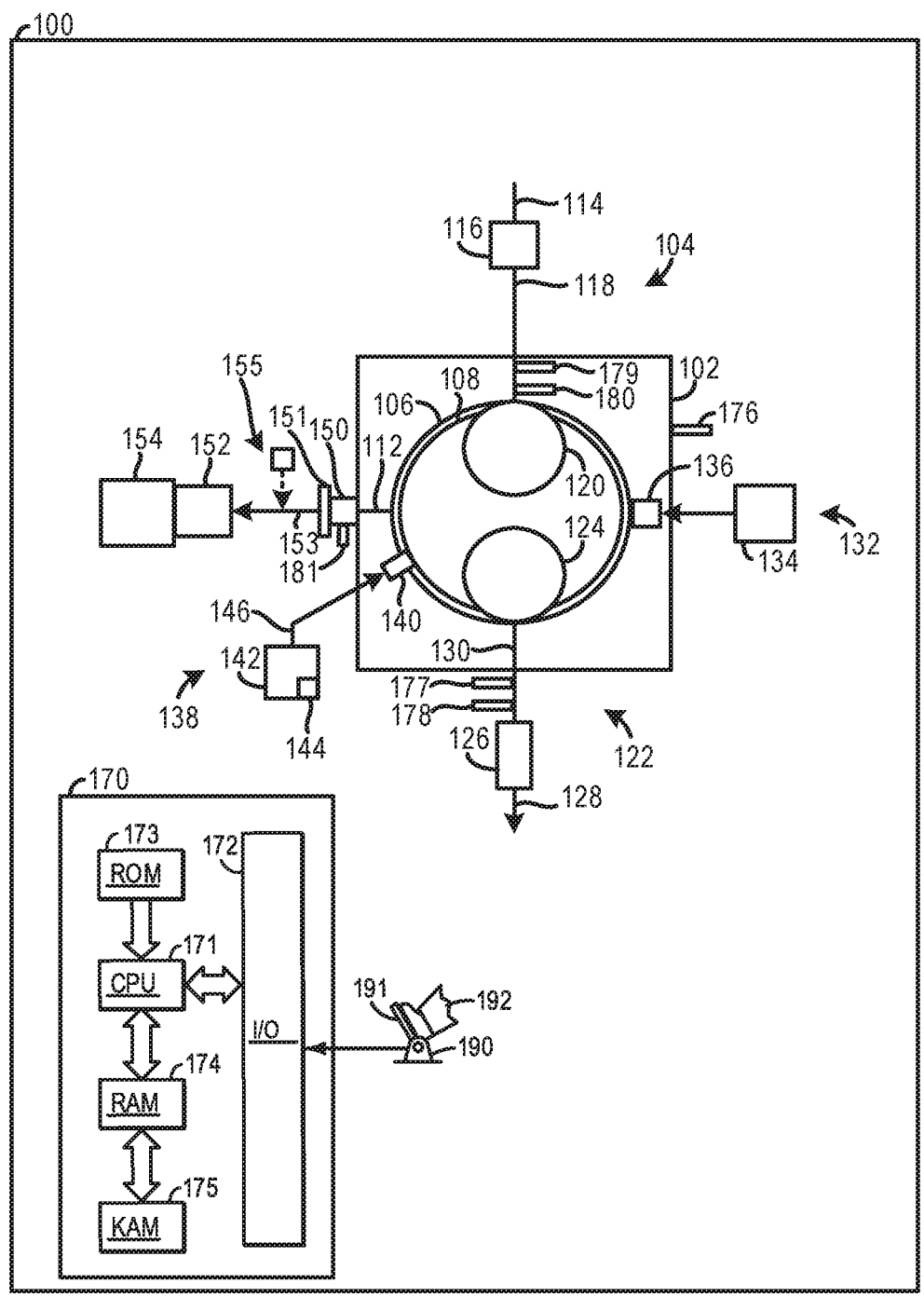
FIG. 1 shows a schematic depiction an engine and belt tensioning system.
Figure 2:
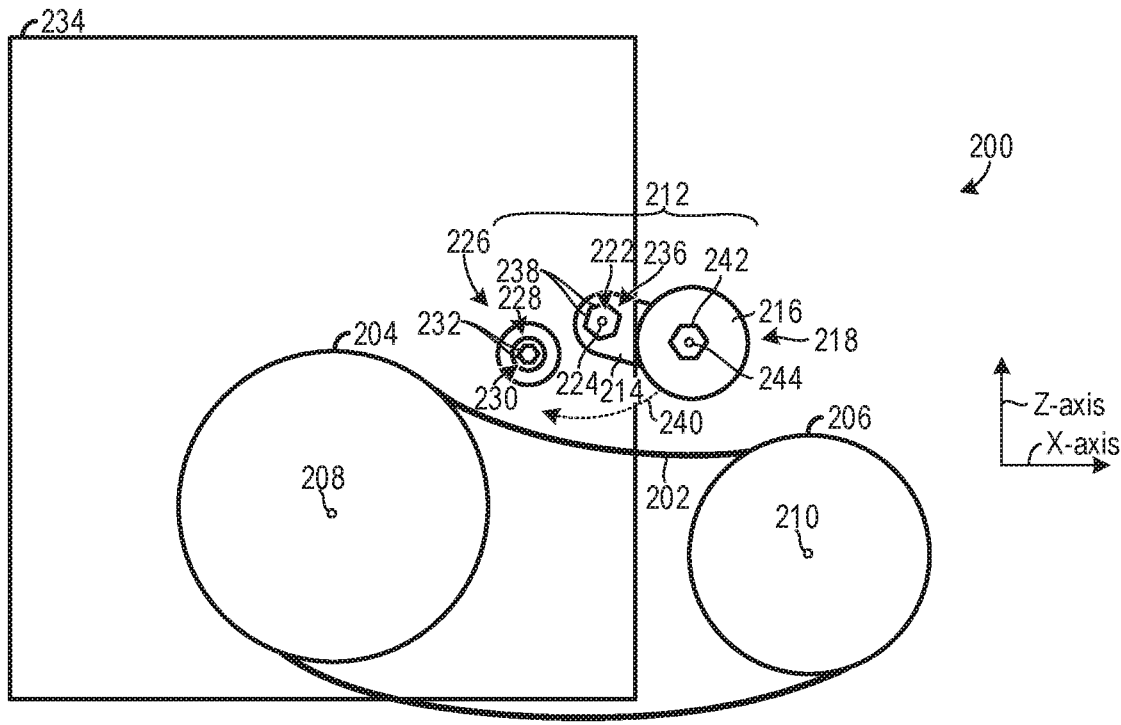
FIG. 2 shows an example of a belt tensioning system in an un-tensioned configuration.
Figure 3:
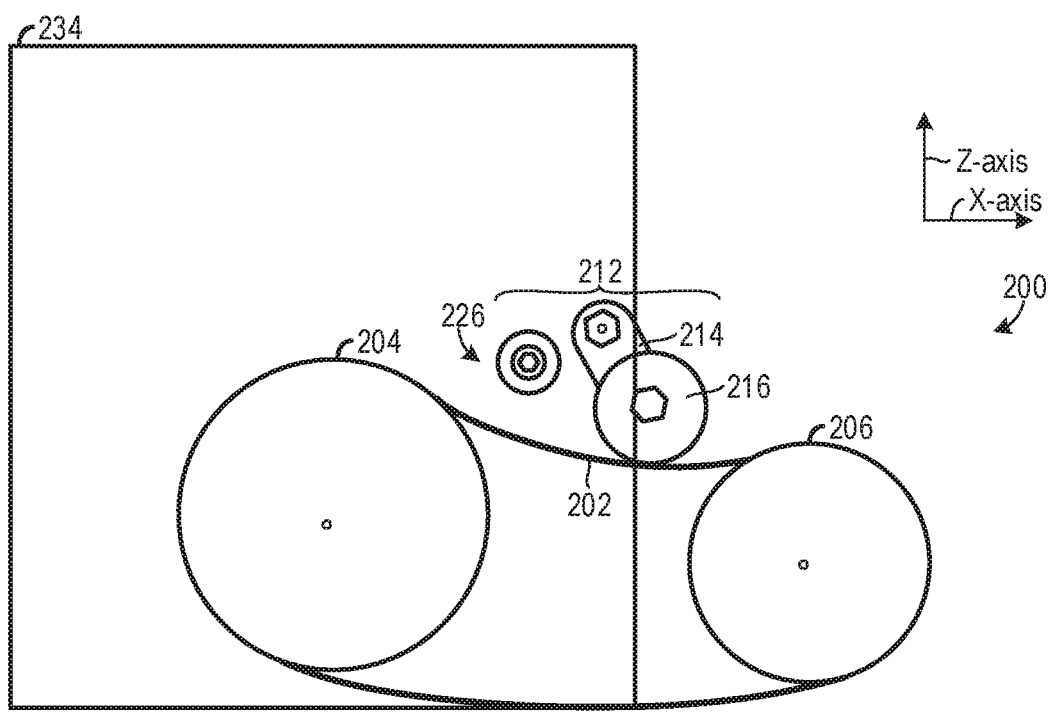
FIGS. 3-4 show the belt tensioning system, depicted in FIG. 2, in various partially tensioned and tensioned configurations.
Figure 4:
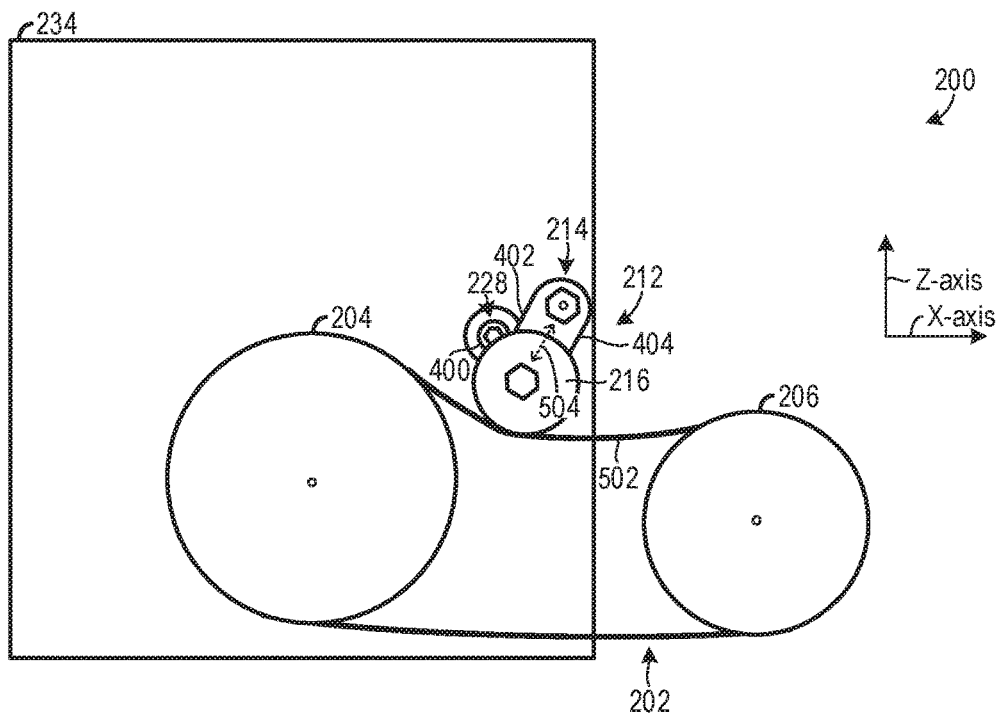
Figure 5:
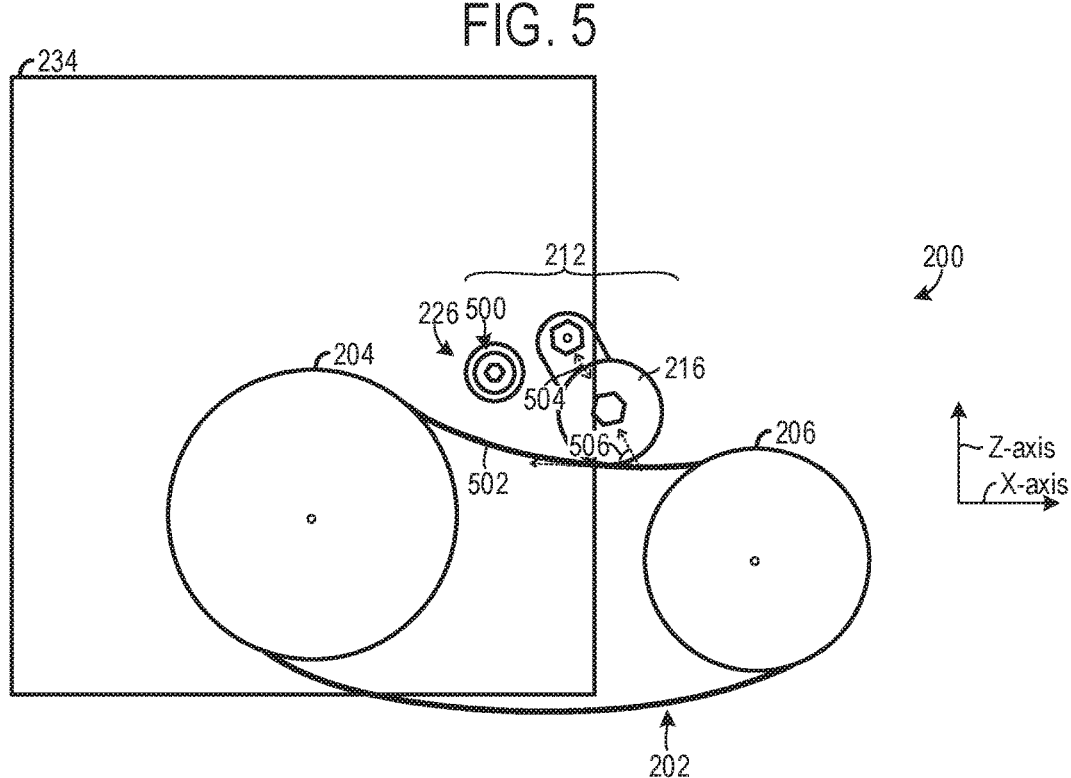
FIG. 5 shows the belt tensioning system, depicted in FIG. 2, with another type of stop plate.
Figure 6:
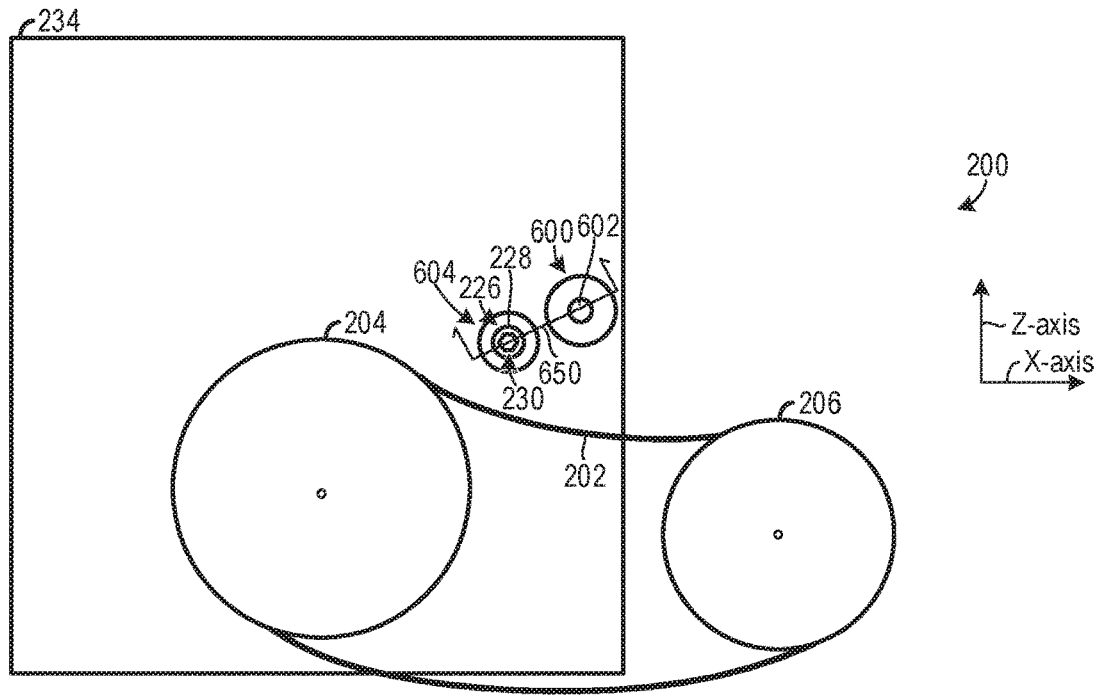
FIG. 6 shows the belt tensioning system, depicted in FIG. 2, with selected components removed.
Figure 7:
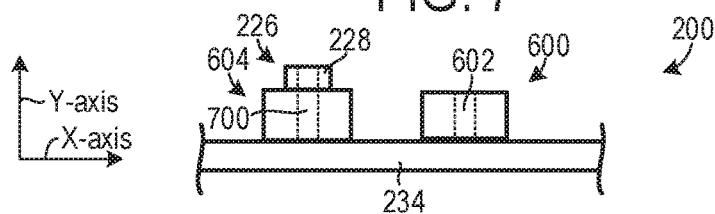
FIGS. 7-9 show different views of selected sections of a tensioning device in the belt tensioning system, shown in FIG. 2.
Figure 8:
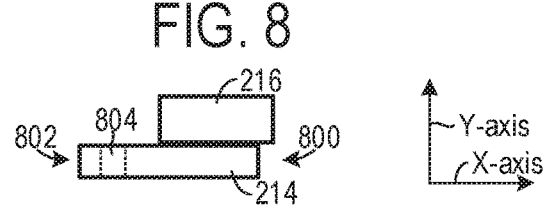
Figure 9:
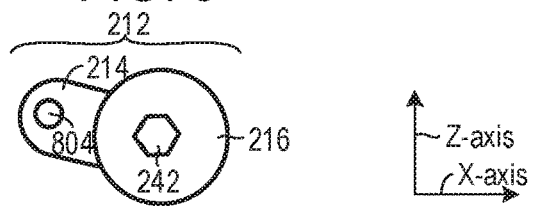

FIG. 1 shows a depiction of a vehicle including an engine and a belt tensioning system. FIGS. 2-4 show a belt tensioning sequence in an embodiment of the belt tensioning system. FIG. 5 shows the belt tensioning system with a larger stop plate. FIG. 6 shows a detailed view of bosses included in the belt tensioning system depicted in FIGS. 2-4. FIG. 7 shows a cross-sectional view of a section of the belt tensioning system. FIG. 8 shows a top view of a tensioning device in the belt tensioning system. FIG. 9 shows a front view of the tensioning device in the belt tensioning system. FIG. 10 shows a method for installing a stretch belt.

FIG. 1 shows a schematic representation of a vehicle 100 including an internal combustion engine 102. Although, FIG. 1 provides a schematic depiction of various engine and engine system components, it will be appreciated that at least some of the components may have different spatial positions and greater structural complexity than the components shown in FIG. 1.

An intake system 104 providing intake air to a cylinder 106, is also depicted in FIG. 1. It will be appreciated that the cylinder may be referred to as a combustion chamber. A piston 108 is positioned in the cylinder 106. Although, FIG. 1 depicts the engine 102 with one cylinder and piston. The engine 102 may have additional cylinders and pistons, in other examples. For instance, the engine 102 may include a plurality of cylinders that may be positioned in various formations, such as in banks, in an inline configuration, etc.

The intake system 104 includes an intake conduit 114 and a throttle 116 coupled to the intake conduit. The throttle 116 is configured to regulate the amount of airflow provided to the cylinder 106. For instance, the throttle 116 may include a rotatable plate varying the flowrate of intake air passing there through. In the depicted example, the throttle 116 feeds air to an intake conduit 118 (e.g., intake manifold). In turn, the intake conduit 118 directs air to an intake valve 120. The intake valve 120 opens and closes to allow intake airflow into the cylinder 106 at desired times. The intake valve 120, may include in one example, a poppet valve with a stem and a valve head seating and sealing on a cylinder port in a closed position.

Further, in other examples, such as in a multi-cylinder engine additional intake runners may branch off the intake conduit 118 and feed intake air to other intake valves. It will be appreciated that the intake conduit 118 and the intake valve 120 are included in the intake system 104. Moreover, the engine shown in FIG. 1 includes one intake valve and one exhaust valve. However, in other examples, the cylinder 106 may include two or more intake and/or exhaust valves.

An exhaust system 122 configured to manage exhaust gas from the cylinder 106 is also included in the vehicle 100, depicted in FIG. 1. The exhaust system 122 includes an exhaust valve 124 designed to open and close to allow and inhibit exhaust gas flow to downstream components from the cylinder. For instance, the exhaust valve may include a poppet valve with a stem and a valve head seating and sealing on a cylinder port in a closed position.

The exhaust system 122 also includes an emission control device 126 coupled to an exhaust conduit 128 downstream of another exhaust conduit 130 (e.g., exhaust manifold). The emission control device 126 may include filters, catalysts, absorbers, combinations thereof, etc., for reducing tailpipe emissions. The engine 102 also includes an ignition system 132 including an energy storage device 134 designed to provide energy to an ignition device 136 (e.g., spark plug). For instance, the energy storage device 134 may include a battery, capacitor, flywheel, etc. Additionally or alternatively, the engine 102 may perform compression ignition. As such, in one example, the ignition system 132 may be omitted from the engine 102 and compression may be used to ignite an air fuel mixture during engine combustion cycles.

FIG. 1 also shows a fuel delivery system 138. The fuel delivery system 138 provides pressurized fuel to a fuel injector 140 from a fuel reservoir 142. In the illustrated example, the fuel injector 140 is a direct fuel injector coupled to cylinder 106. Additionally or alternatively, the fuel delivery system 138 may also include a port fuel injector designed to inject fuel upstream of the cylinder 106 into the intake system 104. For instance, the port fuel injector may be an injector with a nozzle spraying fuel into an intake port at desired times. The fuel delivery system 138 includes a fuel pump 144 designed flow pressurized fuel to downstream components. For instance, the fuel pump 144 may be an electric pump with a piston and an inlet in the fuel tank that draws fuel into the pump and delivers pressurized fuel to downstream components. However, other suitable fuel pump configurations have been contemplated. Furthermore, the fuel pump 144 is shown positioned within the fuel reservoir 142. Additionally or alternatively the fuel delivery system may include a second fuel pump (e.g., higher pressure fuel pump) positioned external to the fuel tank. A fuel line 146 provides fluidic communication between the fuel pump 144 and the fuel injector 140. The fuel delivery system 138 may include additional components such as a higher-pressure pump, valves (e.g., check valves), return lines, etc., to enable the fuel delivery system to inject fuel at desired pressures and time intervals.

During engine operation, the cylinder 106 typically undergoes a four-stroke cycle including an intake stroke, compression stroke, expansion stroke, and exhaust stroke. During the intake stroke, generally, the exhaust valve closes and intake valve opens. Air is introduced into the combustion chamber via the corresponding intake conduit, and the piston moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel in the combustion chamber is ignited via a spark from an ignition device, resulting in combustion. However, in other examples, compression may be used to ignite the air fuel mixture in the combustion chamber. During the expansion stroke, the expanding gases push the piston back to BDC. A crankshaft converts this piston movement into a rotational torque of the rotary shaft. During the exhaust stroke, in a traditional design, exhaust valve is opened to release the residual combusted air-fuel mixture to the corresponding exhaust passages and the piston returns to TDC.

The vehicle 100 includes a crankshaft 150 receiving rotational input from the piston 108. Rods or other suitable mechanical components may transfer the rotational motion to the crankshaft 150. Thus, the piston 108 is coupled to the crankshaft 150 via a piston rod 112 and/or other suitable mechanical component(s). It will be appreciated that the crankshaft 150 may be coupled to a transmission which provides motive power to a drive wheel.

A crankshaft pulley 151 is rotationally coupled to the crankshaft 150. Thus, the crankshaft pulley 151 and the crankshaft 150 may rotate at a common rotational speed, in one example. However, other crankshaft and pulley arrangements have been envisioned. The crankshaft pulley 151 is rotationally coupled to an accessory pulley 152 via a stretch belt 153.

The accessory pulley 152 may drive an accessory device 154. The accessory device 154 may be a water pump, an alternator, a power steering pump, and/or an air conditioning pump.

It will be appreciated that other engine configurations have been contemplated that rotationally couple the crankshaft to accessory devices. For instance, additionally pulleys may be used to drive other accessory devices. For example, a first crankshaft pulley may be rotationally coupled to a first accessory pulley driving a first accessory via a first stretch belt and a second crankshaft pulley may be rotational coupled to a second accessory pulley driving a second accessory via a second stretch belt. In yet another example, one crankshaft pulley may rotationally drive multiple accessory devices. For instance, a stretch belt coupled to the crankshaft pulley may be rotationally coupled to multiple accessory pulleys driving different accessories (e.g., water pump, alternator, steering pump, etc.).

A belt tensioning system 155 is provided in the engine 102 to tension the stretch belt 153, to reduce belt slipping and NVH caused by the slippage. The belt tensioning system 155 is schematically illustrated in FIG. 1. However, it will be appreciated that the belt tensioning system 155 has greater structural complexity than is depicted in FIG. 1. FIGS. 2-9 depict a structural example of the belt tensioning system and is described in greater detail herein.

The belt tensioning system 155 includes a tensioning device designed to releasably tension the stretch belt 153. Specifically, the tensioning device may be efficiently tensioned and un-tensioned during manufacturing as well as servicing and repair of the engine 102. For instance, installation or servicing personnel may use tools to manipulate the belt tensioning system 155 to quickly tension and un-tension the stretch belt 153. It will be appreciated that the belt tensioning system 155 may be designed to tension a stretch belt driving multiple accessories. Further in other examples, a plurality of belt tensioning systems may be provided in the vehicle to tension a plurality of distinct stretch belts. In some instances, each stretch belt system may be adapted to provide a varied amount of tension by providing differently sized arm stops, described in greater detail herein. In this way, the belt tensioning system's applicability may be increased, driving down vehicle manufacturing costs.

The vehicle 100 may also include a transmission (not shown) rotationally coupled to the crankshaft 150. The transmission may include such components as a flywheel, a gearbox, clutch, etc., providing desired rotational input to vehicle drive wheels.

FIG. 1 also shows a controller 170 in the vehicle 100. Specifically, controller 170 is shown in FIG. 1 as a conventional microcomputer including: microprocessor unit 171, input/output ports 172, read-only memory 173, random access memory 174, keep alive memory 175, and a conventional data bus. Controller 170 is configured to receive various signals from sensors coupled to the engine 102. The sensors may include engine coolant temperature sensor 176, exhaust gas composition sensor 177, exhaust gas airflow sensor 178, an intake airflow sensor 179, manifold pressure sensor 180, engine speed sensor 181, etc. Additionally, the controller 170 is also configured to receive pedal position (PP) from a pedal position sensor 190 coupled to a pedal 191 actuated by an operator 192.

Additionally, the controller 170 may be configured to trigger one or more actuators and/or send commands to components. For instance, the controller 170 may trigger adjustment of the throttle 116, the fuel delivery system 138, etc. Specifically in one example, the controller 170 may send signals to an actuator in the throttle 116 to adjust the airflow provided to the cylinder 106. The other adjustable components receiving commands from the controller may also function in a similar manner.

Therefore, the controller 170 receives signals from the various sensors and employs the various actuators to adjust engine operation based on the received signals and instructions stored in memory (e.g., non-transitory memory) of the controller.

In yet another example, the amount of component, device, actuator, etc., adjustment may be empirically determined and stored in predetermined lookup tables and/or functions. For example, one table may correspond to throttle control and a second table may correspond to fuel delivery system control.

FIGS. 2-4 show a tensioning sequence in a belt tensioning system 200 where the tension exerted on a stretch belt 202 via the system is varied. It will be appreciated that the sequence, shown in FIGS. 2-4 may be an installation sequence occurring during manufacturing. However, it will be appreciated that the sequence may also be carried out during system servicing. In such an example, the belt may be un-tensioned is a reverse sequence and then tensioned in the sequence depicted in FIGS. 2-4. The stretch belt 202 is rotationally coupled to a crankshaft pulley 204 and an accessory pulley 206. The crankshaft pulley 204 is rotationally coupled to a crankshaft, such as the crankshaft 150, shown in FIG. 1. Additionally, the accessory pulley 206 may be rotationally coupled to an accessory device, such as the accessory device 154, shown in FIG. 1. Therefore, it will be appreciated that the belt tensioning system 200, shown in FIGS. 2-4 is an example of the belt tensioning system 155, shown in FIG. 1.

FIG. 2 specifically illustrates the belt tensioning system 200 and the stretch belt 202 rotationally coupled to the crankshaft pulley 204 and the accessory pulley 206.

The stretch belt 202 may be constructed out of one or more materials have a selected amount of flexibility that allows the belt to be expanded to fit on the crankshaft and accessory pulleys. Once installed the stretch belt may therefore have a selected amount of belt tensioning, in one example.

The crankshaft pulley 204 may include a pivot 208 (e.g., bearing) facilitating rotation of the pulley. Likewise, the accessory pulley 206 may include a pivot 210 (e.g., bearing) facilitating rotation of the pulley. The pivots may have different sizes and/or configurations depending on the pulley size, end-use requirements, etc.

The belt tensioning system 200 includes a tensioning device 212 having a pivoting arm 214 (e.g., tensioning arm) with a tensioning pulley 216 coupled thereto. Specifically, in the illustrated example, the tensioning pulley 216 is positioned at an end 218 of the pivoting arm 214. However, other tensioning pulley locations have been contemplated. The tensioning device 212 does not include a spring tensioner. As described herein, a spring tensioner is a device utilizing a spring (e.g., coil spring, leaf spring, etc.) and other mechanical components to tension a belt. By eliminating the spring tensioner, the cost of the tensioning device may be reduced and the installation efficiency of the tensioning device may be increased.

The pivoting arm 214 includes a pivoting interface 222 with a pivot point 224 about which the arm pivots. In the illustrated example, the pivoting arm 214 may be attached to a boss extending from a front engine cover 234. However, in other instances, the pivoting arm may include an extension mating with a recess in the front engine cover 234. Still further in other examples, a bearing may be included in the pivoting arm 214 and/or the front engine cover 234 to allow rotation of the pivoting arm. As shown, the pivot point 224 is positioned vertically above the accessory pulley 206 and the crankshaft pulley 204. However, other pivot point configurations have been contemplated. X, Y, and Z axes are provided in FIG. 2 as well as FIGS. 3-9 for reference. In one example, the Z axis may be parallel to a gravitational axis. Furthermore, the X axis may be a lateral axis and the Y axis may be a longitudinal axis. However, other orientations of the axes have been contemplated.

Additionally, FIG. 2 shows the tensioning device 212 in an un-tensioned configuration. In the un-tensioned configuration the tensioning pulley 216 is spaced away from the stretch belt 202 and therefore does not exert tension thereon. In this way, the stretch belt 202 is allowed to extend between the crankshaft pulley 204 and the accessory pulley 206 with tension applied by the tensioning device 212. It will be appreciated that tensioning device 212 may be in an un-tensioned configuration during engine inactivity while the crankshaft is not rotating to allow the belt to be installed, serviced, etc. However, in other examples, the crankshaft pulley may be rotated while the tensioning belt is in the un-tensioned configuration.

The belt tensioning system 200 and specifically the tensioning device 212 also includes an arm stop 226. The arm stop 226 is positioned in a path 240 (e.g., rotational path) of the pivoting arm 214 and is designed to limit rotation of the pivot arm, thereby limiting the amount of tension the tensioning pulley 216 exerts on the stretch belt 202. The arm stop 226 includes a stop plate 228. In the illustrated example, the arm stop 226 has a continuous uninterrupted shape. However, other arm stop profiles have been contemplated. Furthermore, the location where the arm stop 226 limits the rotation of the pivot arm depends on the size of the stop plate. In this way, varying the size of the stop plate raises or lowers the tension exerted on the stretch belt via the tensioning device 212, thereby setting the amount of tension the tensioning pulley 216 exerts on the stretch belt 202.

An attachment apparatus 230 is also included in the arm stop 226. The attachment apparatus 230 is designed to allow the stop plate 228 to be secured as well as removed. In this way, the stop plate 228 may be switched out with stop plates having different sizes, profiles, etc.

Additionally, in the un-tensioned configuration the attachment apparatus 230 included in the arm stop 226 may also be loosened. Loosening the attachment apparatus 230 may allow the stop plate 228 to be removed. For instance, the stop plate 228 may be swapped out with a differently dimensioned plate exerting a different tension on the stretch belt 202 when the system is in the tensioned configuration.

In the illustrated example, the attachment apparatus 230 is a bolt having a plurality of planar faces 232 on a head. In one example, the bolt may include threads that engage with threads in a boss 604 shown in FIG. 6, in the front engine cover 234. However, other attachment apparatus configurations have been contemplated. For instance, the attachment apparatus 230 may be a nut, a screw, a clamp, combinations thereof, etc. The attachment apparatus 230 may be designed to be efficiently attached and loosened using common tools such as sockets, screwdrivers, hex-wrenches, etc. It will be appreciated that tightening the attachment apparatus 230 secures the stop plate 228 to a boss 604, shown in FIG. 6, in the front engine cover 234.

Specifically, the attachment apparatus 230 and a face of the front engine cover 234 may clamp the arm stop 226 in a desired position. However, loosening the attachment apparatus 230 by a certain amount allows the arm stop to be removed.

An attachment apparatus 236 securing the pivoting arm 214 to the front engine cover 234 is also illustrated in FIG. 2. The attachment apparatus 236 is a bolt having a plurality of planar faces 238, in the illustrated example. However, other attachment apparatus configurations have been contemplated. For instance, the attachment apparatus may be a bolt, a screw, a clamp, a bolt with an alternate amount of faces, combinations thereof, etc. The attachment apparatus 236 may be designed to be efficiently attached and loosened using conventional tools such as sockets, screwdrivers, hex-wrenches, etc. In this way, the belt tensioning system 200 may be efficiently installed, serviced, etc., without the use of special tools, in one example. Consequently, manufacturing and servicing costs of the belt tensioning system 200 may be reduced.

Tightening of the attachment apparatus 236 beyond a threshold value prevents rotation of the pivoting arm 214. On the other hand, loosening of the attachment apparatus 236 beyond a threshold value permits rotation of the pivoting arm 214. It will be appreciated that when the attachment apparatus is loosened beyond the threshold value the pivoting arm is allowed to rotate (e.g., freely rotate) without being restricted by torque exerted on the arm by a spring, in one example. Numerous suitable threshold values have been contemplated such as 5 Nm, 10 Nm, a range between 5 and 20 Nm, etc. The threshold values may be calculated based on the material construction and the profile of the pivoting arm, the attachment apparatus, etc., as well as desired belt tensioning in the system.

The orientation of the pivoting arm 214 may be adjusted by loosening the attachment apparatus 236 such that the pivoting arm 214 and the tensioning pulley 216 can be rotated (e.g., freely rotated) about the pivot point 224. The pivoting arm 214 travels along the path 240 (e.g., arc) when the arm is pivoted about the pivot point 224. It will be appreciated the movement of the pivoting arm 214 about the rotational path varies the tension exerted on the stretch belt via the tensioning pulley 216. Such operation may be carried out to place the tensioning device in the configurations shown in FIGS. 3-4.

An attachment apparatus 242 attaches the tensioning pulley 216 to the pivoting arm 214. The attachment apparatus 242 may be a bolt, a nut, a clamp, combinations thereof, etc., securing the tensioning pulley 216 to the pivoting arm 214. Additionally, the tensioning pulley 216 pivots about a pivot point 244.

FIGS. 3-4 show the tensioning device 212 in the belt tensioning system 200 in different tensioned configurations. Specifically, FIG. 3 shows the tensioning device 212 in partially tensioned configuration and FIG. 4 shows the tensioning device 212 in a tensioned configuration where the arm stop 226 limits the rotational movement of the pivoting arm. Therefore, the arm stop 226 acts to set the amount of tension exerted on the stretch belt 202 via the tensioning device 212 and specifically the tensioning pulley 216. FIGS. 3 and 4 again show the crankshaft pulley 204, the accessory pulley 206, and the front engine cover 234.

As shown in FIG. 3, the tensioning pulley 216 is in rotational contact with the stretch belt 202. Furthermore, the tensioning pulley 216 exerts tension on the stretch belt 202 in the configuration shown in FIG. 3.

FIG. 4 again shows the tensioning pulley 216 exerting greater tension on the stretch belt 202 when compared to the configuration shown in FIG. 3. As shown, an outer surface 400 of the stop plate 228 is in face sharing contact with a first side 402 of the pivoting arm 214. FIG. 4 also shows a second side 404 of the pivoting arm 214 which is not in face sharing contact with the stop plate 228. The first side 402 and the second side 404 are parallel, in the illustrated example. However, other contours of the pivoting arm have been contemplated, such as convex or concave sides which may allow the arm to smoothly engage the stop plate 228. The stop plate 228 has a curved outer contour to allow for a smooth interaction between the plate and the pivoting arm 214. However, other stop plate contours have been contemplated. For instance, the stop plate 228 may have a planar contour in certain sections. For example, the stop plate 228 may be in the shape of a polygon. Still further, in other examples, the stop plate 228 may have two opposing planar sides and two opposing curved sides. In other examples, the stop plate 228 may have some concave surfaces and some convex surfaces.

FIG. 5 shows the belt tensioning system 200 with a stop plate 500 having a larger diameter than the stop plate 228, shown in FIG. 4. When the stop plate 500 is in face sharing contact with the pivoting arm 214, the stop plate 500 sets the tensioning pulley 216 in a position that exerts greater tension on the stretch belt 202 when compared to the stop plate 228, shown in FIG. 4. In the depicted installation scenario, the pivoting arm 214 is rotated beyond a perpendicular arrangement with regard to the stretch belt 202. FIG. 5 specifically shows the pivoting arm 214 in an angular orientation that is rotated past the perpendicular arrangement between the pivoting arm and an upper segment 502 of the stretch belt 202. A longitudinal axis 504 of the pivoting arm 214 is shown in FIG. 5. The longitudinal axis 504 may be used to define the angular orientation between the upper segment 502 of the stretch belt 202. An angle 506 formed between pivoting arm 214 and the upper segment 502 of the stretch belt 202 is also shown in FIG. 5.

Turning back to FIG. 4, the pivoting arm 214 has been rotated past the perpendicular arrangement between the upper segment 502 of the stretch belt 202 and the pivoting arm 214. Again, the longitudinal axis 504 of the pivoting arm 214 is provided for reference. It will be appreciated that once the pivoting arm 214 is rotated in a clockwise direction beyond the perpendicular arrangement with regard to the upper segment 502 of the stretch belt 202 the belt tension pushes the pivoting arm 214 towards the arm stop 226 and specifically the stop plate 228. Thus, if the size of the stop plate 228 is increased, as is the case with the stop plate 500 shown in FIG. 5, it will hold the pivoting arm 214 closer to the perpendicular arrangement which results in higher belt tension. On the other hand, when the size of the stop plate in the arm stop 226 is decreased the pivoting arm 214 rotates further away from the perpendicular arrangement. Consequently, the tension exerted on the stretch belt 202 via the tensioning pulley 216 is decreased due to the pulley being positioned further away from the stretch belt. However, other installation scenarios and system arrangements have been contemplated. For instance, the arm stop 226 may not allow the pivoting arm 214 to rotate in a clockwise direction beyond the perpendicular arrangement, in some examples.

It will be appreciated that the stop plate 228, shown in FIG. 4, or the stop plate 500, shown in FIG. 5, may be switched out when the pivoting arm 214 is spaced away from the arm stop 226. In this way, the tension exerted on the stretch belt 202 via the belt tensioning system 200 may be varied by switching out the stop plate. Consequently, the system's adaptability is increased. For instance, the belt tensioning system may be used for different belts in the engine having different tensioning requirements or may be used in different engines. In one use case example, a stop plate allowing the tensioning device to exert a greater amount of tension on the stretch belt may be installed in the system, due to unwanted elongation of the stretch belt. In this way, the tension exerted on the stretch belt may be increased over time to increase the belt's longevity. FIG. 5 again shows the crankshaft pulley 204 and the accessory pulley 206. The front engine cover 234 and the tensioning device 212 are also shown in FIG. 5.

FIG. 6 shows the belt tensioning system 200 without the pivoting arm and the tensioning pulley to provide an unobstructed view of the arm stop 226 and specifically the stop plate 228. FIG. 6 shows a boss 600 for mounting of the pivoting arm 214, shown in FIGS. 2-5. The boss 600 includes an opening 602 that may be threaded to allow the attachment apparatus 236, shown in FIG. 2, to engage/ disengage therewith. However, as previously discussed, the belt tensioning system 200 may include other attachment apparatuses that allow the pivoting arm to be attached and detached from the front engine cover 234.

FIG. 6 also shows a boss 604 for mounting the arm stop 226 to the front engine cover 234. FIG. 6 again shows the crankshaft pulley 204, the accessory pulley 206, and the stretch belt 202. The boss 604 may include an opening with threads to allow the attachment apparatus 230, shown in FIG. 2, to engage/disengage therewith. A viewing plane 650, illustrated in FIG. 6, defines the cross-sectional view shown in FIG. 7.

FIG. 7 shows a cross-sectional view of a portion of the belt tensioning system 200. Specifically, the boss 600 and the boss 604 included in the tensioning device 212 are depicted. The arm stop 226 including the stop plate 228, is also shown in FIG. 7. As shown, the boss 604 includes an opening 700. The opening 700 may receive the attachment apparatus 230, shown in FIG. 2, to allow the arm stop 226 and specifically the stop plate 228 to be secured to the front engine cover 234.

FIG. 8 shows a top view of the pivoting arm 214 and the tensioning pulley 216. As shown, the tensioning pulley 216 is positioned at a first end 800 of the pivoting arm 214. The second end 802 of the pivoting arm 214 may be coupled to the front engine cover 234, shown in FIGS. 2-6. However, other configurations of the pivoting arm 214 and the tensioning pulley 216 have been contemplated. The pivoting arm 214 includes an opening 804 sized to receive the attachment apparatus 236, shown in FIG. 2. Specifically, the attachment apparatus 242, shown in FIG. 2, may extend through the opening 804 and extend into opening 602 in the boss 600, shown in FIG. 6, and engages with threads in the openings 602. It will be appreciated that the opening 804 may have a smooth (e.g., unthreaded) surface to allow the pivoting arm to pivot when the attachment apparatus 236 is loosened. However, numerous suitable attachment configurations that allow the pivoting arm to freely rotate have been contemplated.

FIG. 9 shows a front view of the tensioning device 212 including the pivoting arm 214 and the tensioning pulley 216. The opening 804 of the pivoting arm 214 is again illustrated. Additionally, the attachment apparatus 242 attaching the tensioning pulley 216 to the pivoting arm 214, is also shown in FIG. 9.

FIGS. 2-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 10 shows a method 1000. The method 1000 may be implemented by the belt tensioning system and corresponding components described above with regard to FIGS. 1-9. However, in other examples, the method 1000 may be carried out by other suitable belt tensioning systems and components. Furthermore, it will be appreciated that steps 1004-1008 and/or steps 1012-1016 may be implemented by an automated tooling apparatus and/or by installation/servicing personnel.

At 1002 the method includes in a tensioned configuration, exerting a tension on a stretch belt via a tensioning device. The tension may be exerted on the stretch belt via a tensioning pulley coupled to a pivoting arm in the tensioning device. In the tensioned configuration, rotational movement of the pivoting arm in a direction that determines tension on the belt is limited by an arm stop. Specifically, in the tensioned configuration a portion of the arm stop's outer surface may be in face sharing contact with a portion of the outer surface of the pivoting arm. In this way, the amount of tension exerted on the stretch belt may be precisely set. A size of the stop plate in the arm stop may dictate the amount of tension exerted on the stretch belt via the tensioning device. Thus, in one example, the method may further include, limiting rotation of the pivot arm via the arm stop in the tensioned configuration. It will also be appreciated that step 1002 may occur while the stretch belt is rotating.

At 1004 the method includes transitioning the belt tensioning system between a tensioned configuration and an un-tensioned configuration. Such a step may be carried out during stretch belt servicing, repair, replacement, etc. It will also be appreciated that the reverse operation (i.e., transitioning the system from an un-tensioned configuration to a tensioned configuration) may be carried out during stretch belt installation.

Transitioning the belt tensioning system from the tensioned configuration to an un-tensioned configuration may include steps 1006 and 1008, in one example. At 1006 the method includes releasing an attachment apparatus restricting movement of the pivoting arm in the tensioning device. Releasing the attachment apparatus may in one example include unthreading a bolt with a plurality of planar faces from a boss (e.g., threaded boss). The boss may be coupled to and extend from a front engine cover. The bolt may be unthreaded via a conventional tool such as a socket, a wrench, etc., for instance. Unthreading the bolt may allow the pivoting arm to freely rotate about a pivot. In this way, the attachment apparatus may be quickly released. It will be appreciated that engaging the attachment apparatus may include threading the bolt into the boss. Threading the bolt into the boss may exert a force on the pivoting arm which restricts (e.g., inhibits) pivoting movement of the pivoting arm. In this way, movement of the pivoting arm may be permitted and inhibited via the attachment apparatus.

At 1008 the method includes moving the pivoting arm away from the stretch belt. In such as example, the pivoting arm may be pivoted in a direction away from the stretch belt. In this way, the tension applied to the stretch belt via the tensioning device is released.

At 1010 the method includes in an un-tensioned configuration, allowing the stretch belt to extend between the crankshaft pulley and the accessory pulley without external tensioning via the tensioning device.

In some examples, the method 1000 may include steps 1012-1016. At 1012 the method includes releasing an attachment apparatus in the arm stop. In one example, releasing the attachment apparatus may include unthreading a bolt from a threaded hole in a boss in a front engine cover. However, other attachment apparatus configurations and attachment/release procedures have been contemplated.

At 1014 the method includes replacing a stop plate in the arm stop. The stop plate may have a larger size (e.g., larger radius), in one example. However, in other examples, the stop plate may have a smaller size (e.g., smaller radius). It will be appreciated that a smaller stop plate sets the tensioning device in a location where the device exerts less tension on the stretch belt, in one example. On the other hand, a larger stop plate sets the tensioning device in a location where the device exerts greater tension on the stretch belt, in such an example. In this way, the tension exerted by the tensioning device in the tensioned configuration may be adjusted. Such a tensioning adjustment may take place during servicing, for example. However, the tensioning adjustment may be carried out during installation of the belt tensioning system, thereby increasing the adaptability of the belt tensioning system. At 1016 the method includes re-attaching the attachment apparatus to the arm stop.

Method 1000 allows the tensioning device to be quickly and efficiently transitioned between a tensioned configuration and an un-tensioned configuration or vice versa. In this way, the stretch belt can be quickly tensioned an un-tensioned during manufacturing, servicing, etc.

The belt tensioning system and method described herein have the technical effect of increasing the efficiency of stretch belt tensioning operation. The use of a tensioning device without a spring tensioner also decreases the cost of the system and simplifies manufacturing. Moreover, the complexity of the tooling equipment used to install the stretch belt and tensioning system may be reduced, further reducing manufacturing costs. Furthermore, the belt tensioning system described herein also has the technical effect of increasing the system's adaptability by allowing a stop plate dictating the tension exerted on the stretch belt via the tensioning device to be switched out during manufacturing as well as servicing.

The invention will be further described in the following paragraphs. In one aspect, a belt tensioning system is provided that includes a stretch belt rotationally connected to a crankshaft pulley and an accessory pulley and a tensioning device including a pivoting arm having a tensioning pulley coupled thereto and an arm stop positioned in a path of the pivoting arm to limit rotation of the pivoting arm, the tensioning device not including a spring tensioner and being configurable in both a tensioned and an un-tensioned configuration.

In another aspect, a belt tensioning system in an engine is provided that includes a stretch belt rotationally connected to a crankshaft pulley and an accessory pulley, and a tensioning device including a pivoting arm configurable in a tensioned configuration and an un-tensioned configuration and having a tensioning pulley coupled thereto and an arm stop positioned in a path of the pivoting arm to limit the rotation of the pivoting arm, where the tensioning device does not include a spring tensioner.

In another aspect, a method for installing a stretch belt is provided that includes, in a tensioned configuration of a tensioning device, exerting a tension on a stretch belt via a tensioning pulley coupled to a pivoting arm, where a rotational movement of a pivoting arm in the tensioning device is limited by an arm stop, and in an un-tensioned configuration of the tensioning device, allowing the stretch belt to extend between a crankshaft pulley and an accessory pulley without external tensioning via the tensioning pulley, where the tensioning device does not includes a spring tensioner. In one example, the method may further include transitioning the tensioning device between the tensioned configuration and the un-tensioned configuration. Further, in one example, the method may further include loosening an attachment apparatus in the arm stop and removing a stop plate included in the arm stop.

In another aspect, a belt tensioning system in an engine is provided that includes a stretch belt rotationally connected to a crankshaft pulley and an accessory pulley, and a tensioning device including a pivoting arm having a tensioning pulley coupled thereto and an arm stop positioned in a rotational path of the pivoting arm to limit the rotation of the pivoting arm, where the tensioning device does not include a spring tensioner, where when the pivoting arm is in the tensioned configuration the tensioning pulley is in rotational contact with the stretch belt and exerting tension thereon, and where when the pivoting arm is in the un-tensioned configuration the tensioning pulley is spaced away from the stretch belt.

In any of the aspects or combinations of the aspects, when the pivoting arm is in the tensioned configuration the tensioning pulley may be in rotational contact with the stretch belt and exerting tension thereon.

In any of the aspects or combinations of the aspects, when the pivoting arm is in the un-tensioned configuration the tensioning pulley may be spaced away from the stretch belt.

In any of the aspects or combinations of the aspects, the pivoting arm may include an attachment apparatus positioned at a pivoting interface of the pivoting arm.

In any of the aspects or combinations of the aspects, the attachment apparatus in the pivoting arm may include a plurality of planar faces.

In any of the aspects or combinations of the aspects, the attachment apparatus in the arm stop may include a plurality of planar faces.

In any of the aspects or combinations of the aspects, tightening of the attachment apparatus beyond a threshold value prevents rotation of the pivoting arm and loosening the attachment apparatus beyond a threshold value permits rotation of the pivoting arm.

In any of the aspects or combinations of the aspects, the arm stop may include an attachment apparatus removably attached to a stop plate having an outer surface in face sharing contact with a side of the pivoting arm when the pivoting arm is in the tensioned configuration.

In any of the aspects or combinations of the aspects, where the pivoting arm and the arm stop may be coupled to a front engine cover.

In any of the aspects or combinations of the aspects, when the pivoting arm is in the tensioned configuration a side of the pivoting arm may be in face sharing contact with an outer surface of the arm stop.

In any of the aspects or combinations of the aspects, the arm stop may form a continuous uninterrupted shape.

In any of the aspects or combinations of the aspects, the rotational path of the tensioning pulley may be an arc that varies an amount of tension the tensioning pulley exerted on the stretch belt.

In any of the aspects or combinations of the aspects, an outer surface of the arm stop may be in face sharing contact with an outer surface of the pivoting arm when the tensioning device is in the tensioned configuration.

In any of the aspects or combinations of the aspects, the accessory pulley may be connected a water pump, an alternator, a power steering pump, or an air conditioning pump.

In any of the aspects or combinations of the aspects, transitioning the tensioning device between the tensioned configuration and the un-tensioned configuration may include releasing an attachment apparatus restricting movement of the pivoting arm.

In any of the aspects or combinations of the aspects, the arm stop may include an attachment apparatus removably attached to a stop plate having an outer surface in face sharing contact with a side of the pivoting arm when the tensioning device is in the tensioned configuration.

In any of the aspects or combinations of the aspects, the pivoting arm may include an attachment apparatus positioned at a pivoting interface of the pivoting arm and where tightening of the attachment apparatus beyond a threshold value prevents rotation of the pivoting arm and loosening the attachment apparatus beyond a threshold value permits rotation of the pivoting arm.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A belt tensioning system comprising:
a stretch belt rotationally connected to a crankshaft pulley and an accessory pulley; and
a tensioning device including a pivoting arm having a tensioning pulley coupled thereto and an arm stop positioned in a path of the pivoting arm to limit rotation of the pivoting arm, the arm stop comprising a removably coupled stop plate, wherein the stop plate has an outer surface in direct face sharing contact with a side of the pivoting arm when the tensioning device is in a tensioned configuration;
the tensioning device not including a spring tensioner and being configurable in both the tensioned and an un-tensioned configuration.

2. The belt tensioning system of claim 1, where when the pivoting arm is in the tensioned configuration the tensioning pulley is in rotational contact with the stretch belt and exerting tension thereon.

3. The belt tensioning system of claim 1, where when the pivoting arm is in the un-tensioned configuration the tensioning pulley is spaced away from the stretch belt.

4. The belt tensioning system of claim 1, where the pivoting arm includes an attachment apparatus positioned at a pivoting interface of the pivoting arm.

5. The belt tensioning system of claim 4, where the attachment apparatus in the pivoting arm includes a plurality of planar faces.

6. The belt tensioning system of claim 4, where tightening of the attachment apparatus beyond a threshold value prevents rotation of the pivoting arm and loosening the attachment apparatus beyond a threshold value permits rotation of the pivoting arm.

7. The belt tensioning system of claim 1, where the stop plate is removably coupled via an attachment apparatus that is removably attached to the stop plate.

8. The belt tensioning system of claim 7, where the attachment apparatus in the arm stop includes a plurality of planar faces.

9. The belt tensioning system of claim 1, where the pivoting arm and the arm stop are coupled to a front engine cover.

10. The belt tensioning system of claim 1, where when the pivoting arm is in the tensioned configuration a side of the pivoting arm is in face sharing contact with an outer surface of the arm stop.

11. The belt tensioning system of claim 1, where the arm stop has a continuous uninterrupted shape.

12. The belt tensioning system of claim 1, where the path of the tensioning pulley is an arc that varies an amount of tension the tensioning pulley exerted on the stretch belt.

13. The belt tensioning system of claim 1, where the accessory pulley is connected a water pump, an alternator, a power steering pump, or an air conditioning pump.

14. A belt tensioning system in an engine, comprising:
a stretch belt rotationally connected to a crankshaft pulley and an accessory pulley; and
a tensioning device including a pivoting arm having a tensioning pulley coupled thereto and an arm stop positioned in a rotational path of the pivoting arm to limit rotation of the pivoting arm, the arm stop comprising a removably coupled stop plate, wherein the stop plate has an outer surface in direct face sharing contact with a side of the pivoting arm when the tensioning device is in a tensioned configuration;
where the tensioning device does not include a spring tensioner;
where when the pivoting arm is in the tensioned configuration the tensioning pulley is in rotational contact with the stretch belt and exerting tension thereon; and
where when the pivoting arm is in an un-tensioned configuration the tensioning pulley is spaced away from the stretch belt.

15. The belt tensioning system of claim 14, where the stop plate is removably coupled via an attachment apparatus, and where the attachment apparatus is removably attached to the stop plate.

16. The belt tensioning system of claim 15, where the pivoting arm includes an attachment apparatus positioned at a pivoting interface of the pivoting arm and where tightening of the attachment apparatus beyond a threshold value prevents rotation of the pivoting arm and loosening the attachment apparatus beyond a threshold value permits rotation of the pivoting arm.

17. The bolt tensioning system of claim 15, where the stop plate of the arm stop is removably coupled an engine cover via the attachment apparatus.

18. The bolt tensioning system of claim 17, where the attachment apparatus engages with a boss extending from the engine cover.

19. The bolt tensioning system of claim 7, where the stop plate of the arm stop is removably coupled to an engine cover via the attachment apparatus.

20. The bolt tensioning system of claim 1, further comprising a boss positioned between the stop plate and an engine cover.

* * * * *